(Model.)
T. F. MATTHEWS.
SYRINGE.
No. 367,649. Patented Aug. 2, 1887.
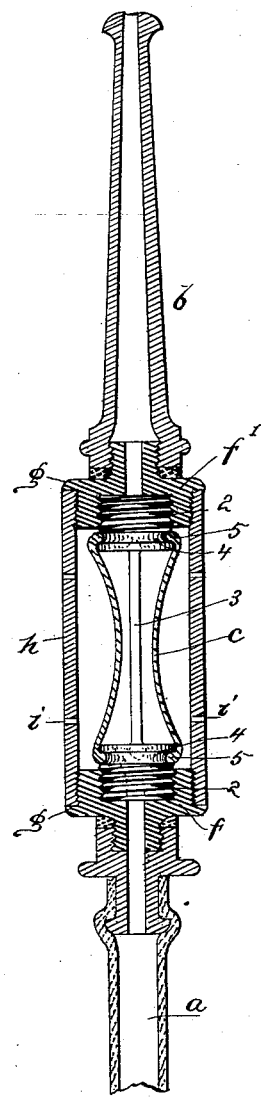
Fig. 1.
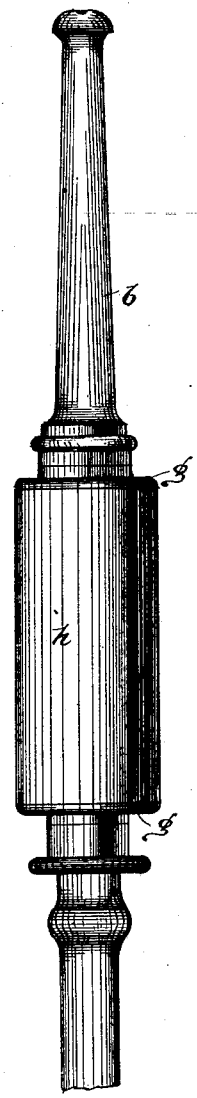
Fig. 2.
Fig. 3.
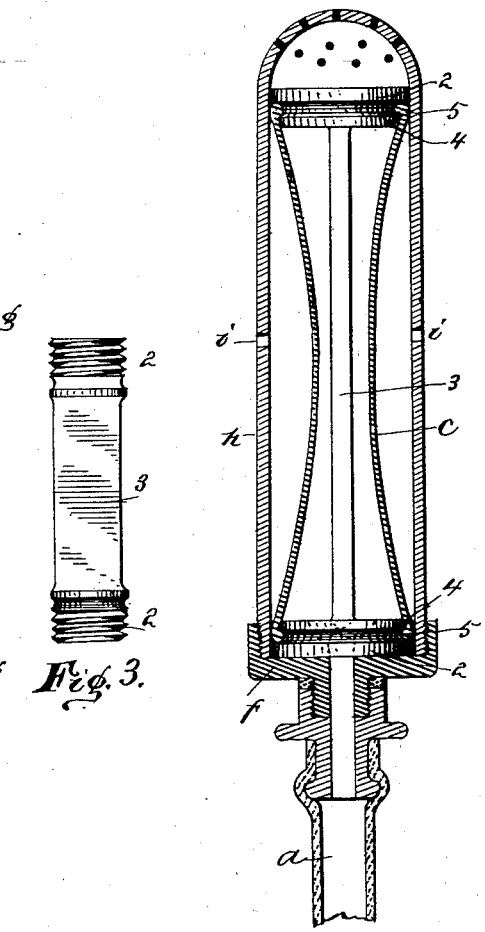
Fig. 4.
Witnesses:
Inventor
Thomas F. Matthews.
N. PETERS. Photo-Lithographer, Washington, D. C.

UNITED STATES PATENT OFFICE.

THOMAS F. MATTHEWS, OF NEW YORK, N. Y.

SYRINGE.

SPECIFICATION forming part of Letters Patent No. 367,649, dated August 2, 1887.

Application filed April 19, 1887. Serial No. 235,351. (Model.)

*To all whom it may concern:*

Be it known that I, THOMAS F. MATTHEWS, of New York, in the county of New York and State of New York, have invented certain new and useful Improvements in Syringes, of which the following is a specification.

This invention relates to syringe attachments comprising a chamber or reservoir in the discharge tube or conduit of the syringe, adapted to be distended by the pressure of the water passing through it while the hand-bulb of the syringe is being compressed and to contract when the hand-bulb is released, and by its contraction to exert sufficient pressure on the water within it to cause a forcible discharge from the nozzle while the hand-bulb is refilling, the operation of the syringe being therefore continuous.

In an application for Letters Patent of the United States made by me October 18, 1886, Serial No. 216,485, I have shown the flexible reservoir or chamber free to contract to its normal condition and have combined therewith a protecting casing or cover.

My present invention relates, first, to the elastic reservoir, and, secondly, to the casing or cover therefor; and it consists, first, in a reservoir of elastic rubber combined with a rigid holder, upon which said reservoir is placed in a stretched or distended condition, whereby the force of the contraction of the reservoir is increased.

The invention consists, secondly, in the combination, with an elastic reservoir adapted to be stretched or distended by the pressure of liquid within it, of a casing inclosing said reservoir and provided with one or more air holes or vents, which permit the displacement of the air from the interior of the casing when the reservoir is distended, all of which I will now proceed to describe.

Of the accompanying drawings, forming a part of this specification, Figure 1 represents a longitudinal section of a reservoir and its casing embodying my invention, the same being applied to the discharge-tube and nozzle of a syringe. Fig. 2 represents a side elevation of the casing, discharge-tube, and nozzle. Fig. 3 represents a side view of the holder on which the reservoir is stretched. Fig. 4 represents an enlarged sectional view of a modification.

The same letters of reference indicate the same parts in all the figures.

In the drawings, *a* represents the discharge-pipe of a syringe, the same being connected, as usual, to a compressible hand-bulb, which is not shown because it does not differ from those now in use.

*b* represents the discharge-nozzle of ordinary or any suitable form. *c* represents the elastic reservoir, which is interposed between the discharge-tube and nozzle and connects said parts, so that all the liquid passing through the tube and nozzle passes also through the reservoir.

In carrying out my invention I make the reservoir preferably in the form of a tube of elastic rubber and place it on a rigid frame or holder. Said frame is of such size and shape that when the rubber tube is placed upon it said tube is necessarily stretched, and is held by the holder in a stretched condition, so that it cannot contract to its normal condition, but remains in a permanent state of tension.

The form of the reservoir and its holder may of course be variously modified; but my purpose is best suited by making the reservoir of a tube of rubber, as already described, and the holder of two externally-threaded end tubes or collars, 2 2, and a flat connecting-piece, 3, to the ends of which the end tubes or collars, 2 2, are rigidly attached.

The rubber tube is normally of such diameter that it must be stretched in order that its ends may inclose the tubular collars 3 3, and said ends are placed upon and secured to the external surfaces of said collars in any suitable way, as by binding them on with wire or cord, or, as I prefer and have here shown, by providing said tubular collars with peripheral grooves 4 4 at their inner ends and forming beads 5 5 on the ends of the rubber tube, said beads being formed to fit the grooves 4 4 and hold themselves in engagement therewith.

The connecting-strip 3 extends longitudinally through the center of the reservoir, as shown in Figs. 1 and 4. It will be seen that the reservoir is at all times in a stretched condition, being partially stretched when contracted to the utmost limit rendered possible by the holder. While therefore the reservoir is adapted to be distended by the pressure of the liquid within it, like the reservoir shown in my former application above referred to, its contraction, after the distending-pressure has ceased, is much more positive and forcible than is that of my other reservoir, and the discharge of liquid caused by the action of the reservoir is more vigorous. The threaded portions of the end collars, 2 2, are secured into caps $f$ $f'$, to which are respectively connected by suitable fittings the discharge-pipe $a$ and nozzle $b$. The caps $f f'$ are externally screw-threaded, and are provided with flanges $g g$.

$h$ represents the casing, which incloses and protects the reservoir $c$. Said casing may be either of rigid material, as hard rubber, metal, &c., or of comparatively yielding material, as rubber not vulcanized to rigidity, although it should be here remarked that the casing should be sufficiently stiff to prevent it from being easily collapsed or creased. The casing is secured to the end caps, $f f'$, by being secured onto the same, its ends abutting against the flanges $g g$. The manner of securing the casing, however, may be variously modified without departing from the spirit of my invention.

I provide the casing with one or more vent-orifices, $i$, to permit the air to escape from the casing when the reservoir is being distended and to enter the casing when the reservoir is contracting.

In Fig. 4 I have shown a modification in which the casing and nozzle are made in one piece, the casing being extended beyond the outer end of the reservoir and provided with a rounded end having numerous orifices. This construction is adapted principally for vaginal purposes.

It is obvious that various other modifications may be made without departing from the spirit of my invention.

I claim—

1. The combination, with the discharge-tube of a syringe, of an elastic reservoir forming a continuation of said discharge-tube, and a holder on which said reservoir is stretched, as set forth.

2. The combination, with the discharge-tube and nozzle, of the elastic reservoir and the holder composed of the end collars and the connecting strip or bar to which said collars are rigidly attached, as set forth.

3. The combination, with an elastic reservoir forming part of the discharge tube or conduit, of a casing surrounding said elastic reservoir, said casing being provided with vent-holes, whereby the air is permitted to escape from the casing when the reservoir is being distended and to enter the casing when the reservoir is contracting, substantially as set forth.

4. The combination of the elastic reservoir, the holder composed of the threaded end collars and the connecting bar or strip, the caps $f f'$, adapted to be secured, respectively, to the discharge-tube and nozzle, and the casing secured to said caps, as set forth.

5. The holder composed of the peripherally-grooved end collars and the connecting bar or strip, combined with the elastic reservoir having beaded ends formed to engage the grooves in the collars, as set forth.

In testimony whereof I have signed my name to this specification, in the presence of two subscribing witnesses, this 13th day of April, 1887.

THOMAS F. MATTHEWS.

Witnesses:
HOFFMAN BEACH,
J. F. POWERS.